Nov. 10, 1942.    B. WALKER    2,301,485
VENETIAN BLIND
Filed Feb. 17, 1942    5 Sheets-Sheet 1

INVENTOR.
Brooks Walker

INVENTOR
Brooks Walker

Nov. 10, 1942. B. WALKER 2,301,485
VENETIAN BLIND
Filed Feb. 17, 1942 5 Sheets-Sheet 5

INVENTOR.
Brooks Walker
BY

Patented Nov. 10, 1942

2,301,485

UNITED STATES PATENT OFFICE 2,301,485

VENETIAN BLIND

Brooks Walker, Piedmont, Calif.

Application February 17, 1942, Serial No. 431,215

15 Claims. (Cl. 160—170)

My invention relates to improvements in Venetian blinds and more particularly to the arrangement of lifting cords and mechanism for operating them, particularly in the larger sizes of blinds where it is necessary to use more than two vertical lifting cords in the blind assembly proper and where because of the size of the blind it is difficult to lift the blind directly by two or more lifting cords without the necessity of putting pulleys in the bottom rail to multiply the cord leverage.

My invention also pertains to improvements in reels for controlling the lift in the Venetian blind without the necessity of additional cord stops or locks outside of the reel, and particularly relative to braking mechanism which has a very substantial braking action in a direction resisting the gravity action of the blinds while offering a very slight resistance during the raising operation. Other improvements are on means of winding two or more cords so that they can be wound in a single reel space in order to wind all of the cords at the same rate throughout the entire lift. Other improvements include crank-operated lift mechanisms, spring angle drives, devices for preventing cords from becoming tangled when tension is released when wound on drum mechanisms that operate easily from the crank but cannot be operated by the pull of the cords, variations of a construction of one directional braking, winding reels having increased leverage as the blind approaches the top and gets heavier, blinds incorporating spring counter balances insufficient to lift the blind but combined with one-way brakes to support the weight where the spring counter balances take up the slack in the wind-up pulleys.

Other objects and features of novelty of my invention will be either specifically pointed out or will become apparent when referring, for a better understanding of my invention, to the following description in conjunction with the accompanying drawings, etc.

The invention is described by way of illustration in the accompanying drawings, in which:

Figure 6 is an enlarged view of the lock tongue on the back plate of Figure 4.

In all views like numerals of reference refer to corresponding parts in the various drawings.

Figures 1, 2, 3, 5:
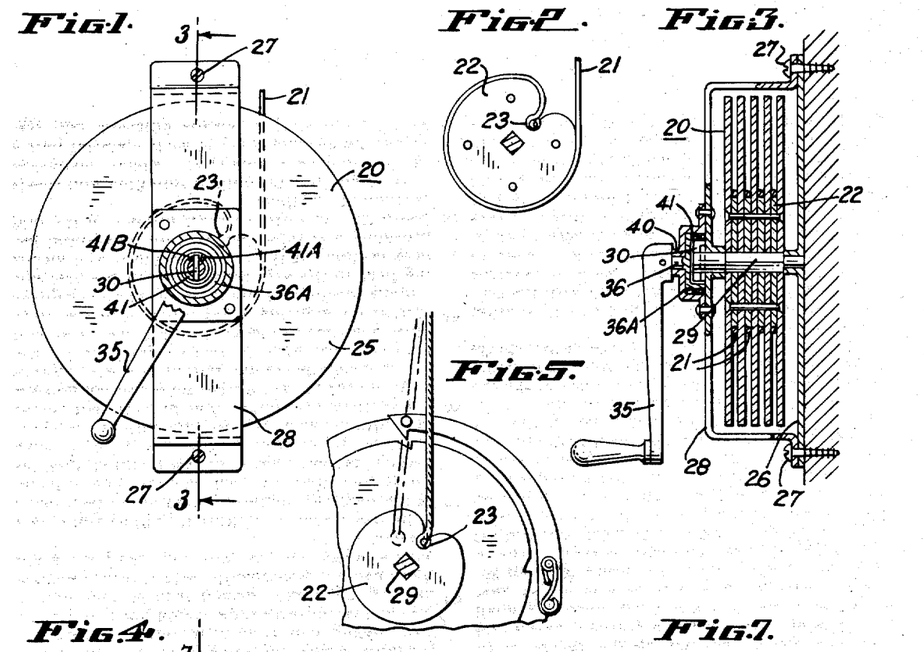
Figure 1 is a side view partly cut away showing a Venetian blind lifting reel embodying one form of my invention.
Figure 2 is a plan view of the portion of the reel on which the lifting cord is wound.
Figure 3 is an end view through section 3—3 of Figure 1.
Figure 5 is a view of a portion of a reel as shown in Figure 4 showing the detail of a lock which may be used for preventing the reel from winding in the wrong direction after the blind has been fully lowered.

In Figures 1, 2, and 3 I have shown a multiple reel 20 for winding a plurality of cords 21 which may be used for lifting a wide Venetian blind where one cord will be adjacent each of a number of ladder tapes. The reel is composed of stamped hub sections 22 of approximately the same thickness as the diameter of the cord to be wound thereon. The hole 23 is assembled with the other partitions which form the pulley all of which have similarly spaced and sized holes so as to form a communicating hole throughout the entire pulley. When it is desired to secure a cord 21 in a given pulley groove, the end is inserted through the opening into hole 23, is fished out through the hole to the outside of the pulley, a knot is tied, and the cord is pulled back through into the hole 23. The knot, however, cannot pull out because the thickness of the hub 22 is only the same as the cord and the knot therefore secures the cord end at the hole 23. The form of the outlet of the hole, being curved, allows the pulley to be turned in either direction without kinking the cord 21 or bending it over a sharp edge which is detrimental in case a metallic cord is used.

Partition members 25 separate the hub sections to form a groove in which the cords can be wound one row wide which has been found necessary when winding a number of cords to get them all to wind at the same rate over a considerable number of pulley revolutions, which is necessary in order that the Venetian blind be lifted with the bottom rail always paralleling the top rail. The pulley is mounted on a backing plate 26 which is secured to the wall by suitable screws 27 which also engage the front crank support plate 28. A square shaft 29 floats in a square hole in the pulley assembly to form a drive connection. The crank end of shaft 29 is slotted and in this slot is a key 30. A crank 35 is suitably fastened to crank shaft 36 with a pin or square or spline and spring catch or any other suitable means such as is common in the automotive industry in connecting window regulator handles to their operating shafts. Crank shaft 36 has an enlarged cylindrically shaped end 36A which is split at one side. A bearing member 40 supports crank shaft 36 and surrounds the section 36A with clearance sufficient to allow a clutch spring 41 to nest therein and bear against the inner diameter of the bearing 40. The ends of spring 41 are turned inward at 41A and 41B so as to intercept the key 30. This whole construction is similar to that used on automotive window regulators to prevent the window from being moved by its own exterior force acting on the glass itself, but to allow the raising and lowering operation of the glass by means of the crank. In this instance, any force tending to operate the drum directly as the pull on the cords 21 through the weight of the blind will act through key 30 to press on the end 41B of the clutch spring, causing it to tighten up in the bearing 40 and prevent the rotation of the drum, thus holding the blind securely in its raised position. However, when it is desired to lower the blind, operation of the crank in a counter-clockwise direction will cause the cylindrical section 36A to contact the end of the spring 41A, releasing the clutch spring 40 and allowing the easy lowering of the blind by means of the crank 36 but without any reaction on the crank tending to drive the crank by reason of the tension on the cords, so that the operator can lower the blind readily without feeling that he is resisting the weight of gravity on the blind, or without any danger of the blind running away in case his hand slips off the crank, as the pulley will not operate except as the crank is rotated in either direction. Also, when the blind gets to its lower extremity and the cord 21 is fully unwound from drum 22 so as to extend straight up from the hole 23, a further rotation of the crank in the direction that lowers the blind will then raise it, winding the cord in the opposite direction on the drum. The mechanism of the clutch spring and its release when operated by the crank moves equally effectively in either direction, allowing for a free lift, a positive hold at any height without any additional motions on the part of the operator, and a free lowering of the blind by the crank but with no danger of lowering by the action of the weight of the blind. This has been found by itself to be a very desirable and advantageous operation, to be extremely foolproof, and to involve the least friction of any device known to applicant.

In Figures 4, 5, 6, and 7 I have shown another form of composite reel, preferably formed from stampings, in which the lifting cords 21 are wound on hub sections 22 similar to those illustrated in Figure 2 and separated by partition members 25 which are secured to a hub 50 which runs on an axle 51 suitably secured to a backing plate 52. A spring 53 urges the entire assembly towards the backing plate which has a projecting stop 52A formed therein which intercepts holes 25A in the rear partition plate. Stops 52A are so formed that they act as a ratchet in combination with the action of spring 53 to positively lock the drum against counter-clockwise rotation when engaged with holes 25A. The outer partition plate has an extension 25B which carries a crank handle 25C for operating the reel. In operation, as it is desired to lift the blind, an outward pull is exerted on the crank 25C which compresses spring 53 by pulling the pulley bearing 50 away from the backing plate 52, thus disengaging the catch 52A. The blind is then wound up to the desired height and then by releasing the outward pull on the crank 25C, spring 53 forces the pulley in so that ratchet 52A engages and locks the pulley against counter rotation which would be caused by the pull on the lifting cords 21. This forms a positive lock and is very simple and cheap to construct. It has the disadvantage during the lowering operation that if the hand slips off the crank, it tends to lock automatically, and the blind may be lowered a short distance before the catch is engaged. However, it has been tested and has been found to be quite satisfactory.

Figures 4, 8:
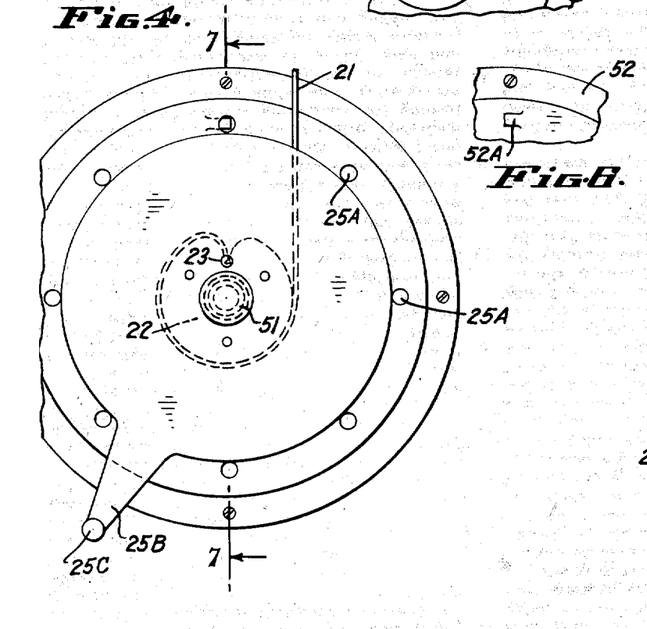
Figure 4 is a side view partly cut away showing another form of lifting reel embodying another form of my invention.
Figure 8 is a side view partly cut away of a reel forming another variation of the invention.
Figure 9:
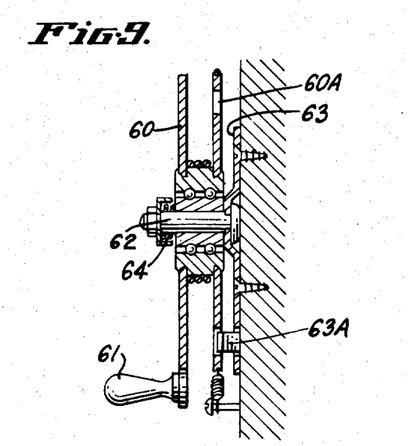
Figure 9 is an end view through section 9—9 in Figure 8.

In Figures 8, 9, 10, and 11 I have shown two types of reels on which a single cord is wound in a wide groove. In Figures 8 and 9 the reel 60 is made of metal, operated by a handle 61, and pivoted on axle 62, which axle 62 is secured to a wall plate 63 by suitable screws or other fasteners. A stop 63A is preferably formed from the wall plate 63 and engages holes or depressions in the back plate 60A of the reel. A spring 64 on the axle 62 urges the reel towards the wall plate so that stop 63A is effective to prevent counter rotation of the reel and to support the blind in any desired position. An outward pull on the handle during the raising or lowering operation compresses spring 64 and disengages the stop 63A during the winding operation similar to the operation described in connection with Figure 7.

Figure 10:
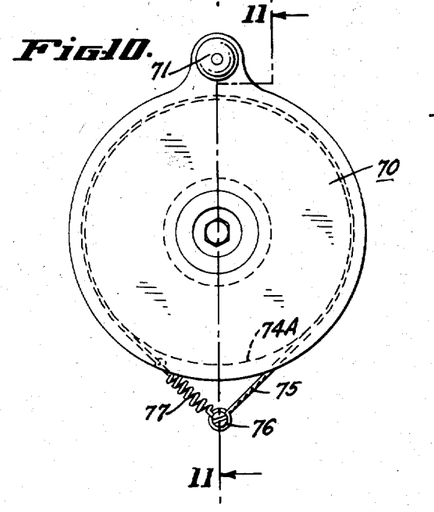
Figure 10 is a side view of another form of the pulley incorporating another form of the invention.
Figure 11:
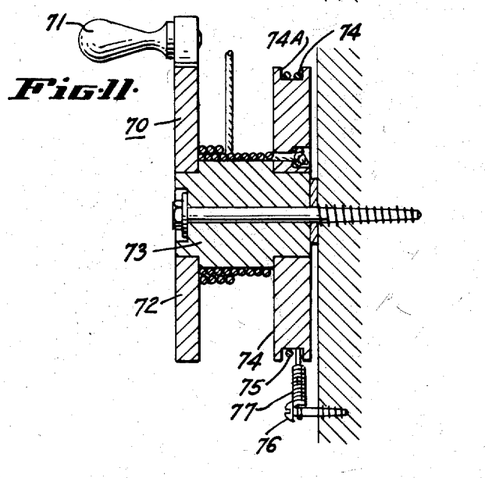
Figure 11 is an end view through section 11—11 of Figure 10.

In Figures 10 and 11 the reel 70 is preferably formed of wood, fibre, or composition, and is operated by a handle 71 carried on the front plate 72 which is mounted on a center section 73 on which the lifting cord or cords are wound.

A rear plate 74 also forms a braking drum 74A about which a cord 75 is wound, one end of said cord being fastened to a suitable anchor 76 and the other end being attached to a spring 77 so as to effectively operate as a one-way brake. When rotated clock-wise as viewed in Figure 10, the lifting cords of the Venetian blind will be wound up to lift the blind, the spring 77 being slightly extended in this case to act only as a slight drag during the lifting operation. When the lifting is stopped, a spring 77 tightens the cord 75 in its one or more turns around the brake drum and as the other end of the cord 75 is anchored to a rigid pivot, a substantial braking effort is exerted on the drum which is sufficient to hold the blind in any desired position without the necessity of engaging a rigid stop or auxiliary brake.

When it is desired to lower the blind, manual force on handle 71 in a counter clock-wise direction overcomes the action of cord 75 acting on the brake drum 74A and lowers the blind with the aid of gravity acting on the blind and pulling on the cords to tend to cause rotation in the same direction.

Figure 7:
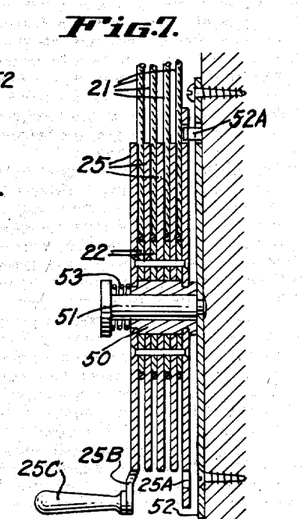
Figure 7 is an end view through section 7—7 in Figure 4.
Figure 8:
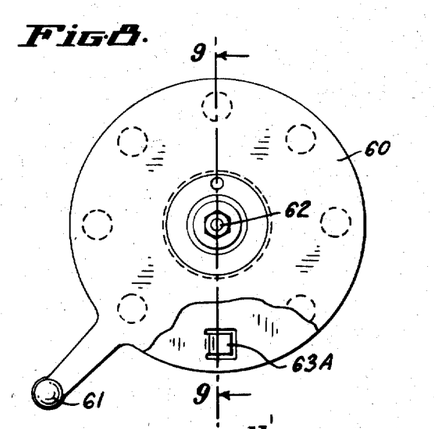

A pulley of the same type of construction can be formed from wood or other suitable inexpensive material by cutting one or more grooves of the same width as the cord for handling multiple cord lift blinds, lifting each cord at exactly the same rate in a manner similar to that accomplished by the multiple grooves shown in Figures 3 and 7.

If the operator tends to continue winding the reel in a counterclock-wise direction after the blind has been fully lowered, it will start to raise again with the lifting cords winding in the opposite direction but the effort required to operate will be materially increased, as the force of the crank will have to overcome not only friction of the brake acting in a self-energizing direction but the dead weight of the blind as well.

This construction has been found to be exceedingly cheap and effective, and during the present period when metals are difficult to get the wooden or composition structure offers many advantages. In place of spring 77 a weight may be used, which has the advantage of exerting the same force on cord 75 regardless of whether or not the cord 75 stretches during the operation or because of changes in humidity. The effect of changes in humidity may be minimized by soaking the cord 75 in a high temperature paraffine or other moisture-repellent compound.

Figure 12:
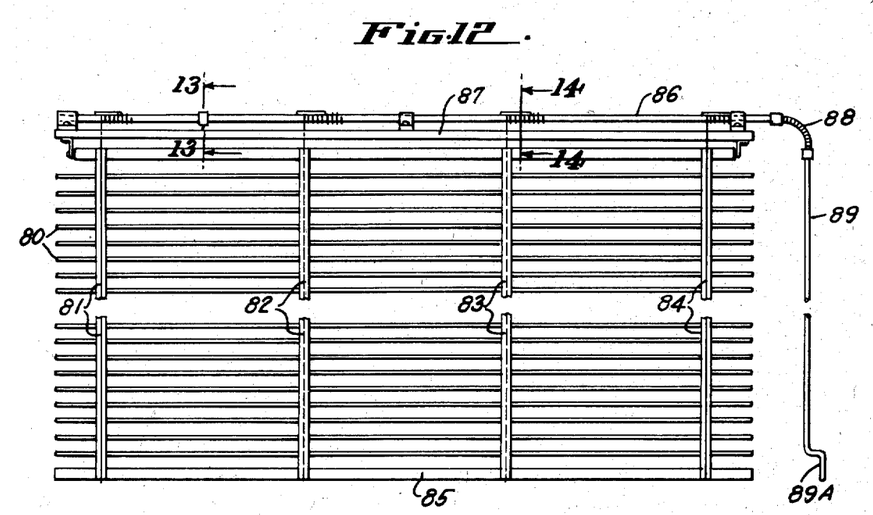
Figure 12 is a side view of a Venetian blind incorporating another form of the invention utilizing a crank, a spring drive, and a one-way brake for winding four cords.
Figure 13:
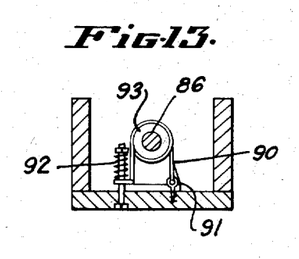
Figure 13 is an end view partly cut away at section 13—13 of Figure 12.
Figure 15:
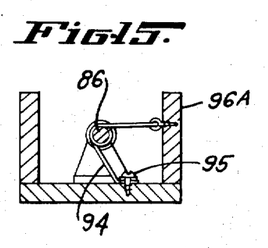
Figure 15 is an end view partly cut away of an alternate construction to that shown in Figure 13.

In Figure 12 I have shown another variation in the application of the one-way brake to a lifting mechanism in which I have shown a Venetian blind provided with slats 80, lifting cords 81, 82, 83, and 84. These may be of a cord, tape, or wire construction and are attached to the bottom rail 85 in any suitable manner. An oscillating winding rod 86 is mounted above the head rail 87 and mounted there on any suitable bearings, one of which is preferably threaded to provide a lead feed to oscillating rod 86 so as to wind the lifting cords neatly and compactly during the lifting operation. At the end of oscillating rod 86 I have provided a spring-angled drive 88 formed by suitably anchoring a spring to the end of oscillating rod 86 and attaching the other end of the spring to crank rod 89. By this means it can be seen that when crank 89A is rotated, oscillating rod 86 will likewise be rotated at somewheres near right angles thereto, which will wind up lifting wires 81, 82, 83, and 84 and lift the blind evenly throughout its length. To hold the blind in any desired position, I have provided a one-way brake with a braking cord 90 suitably anchored at 91 to the head rail or wall, going around the oscillating lifting rod 86 one or more times, being adjustably secured, the other end of which is attached to an adjustable spring element 92 so that the structure acts as a one-way brake resisting rotation in a counterclock-wise direction, as viewed in Figure 13, and offering only the resistance of the spring to rotation in a clock-wise direction in which the blind is lifted. To increase the action of the brake it may be desired to apply the lifting cord to the outside of the drum 93 attached to oscillating rod 86; however, in practice I have found that a suitable braking action can be applied by wrapping the braking cord 90 directly on the oscillating shaft, which eliminates the problem of a long drum to take care of the oscillating motion of the shaft during the winding operation. A further variation of this brake is shown in Figure 15 in which braking cable 94 is rigidly secured to the head rail by screw 95 while the other end of the cord 94 is attached to the side guard element 96A by screw 96. The fact that the side guard is of thin cross section and yieldable allows it to act as a spring to form a one-way brake for resisting rotation of the oscillating rod 86 in a clock-wise direction.

Figure 14:
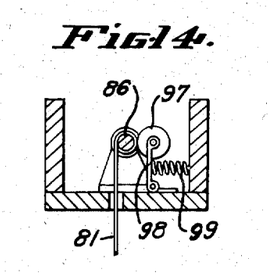
Figure 14 is an end view partly cut away at section 14—14 of Figure 12.

In Figure 14 I have shown a means for keeping the lifting wires 81 from unwinding from the oscillating rod 86 when one end of the blind would catch and hold up during the operation or when someone would raise the bottom rail of the blind for cleaning, looking out the window, or other purposes. This consists of a soft roll 97 preferably of rubber suitably mounted on bracket 98 urged to contact with the wire 81 wound on rod 86 by spring 99. This keeps the wire 81 wound tightly and securely and keeps it from jumping off when slackened.

Figure 16:
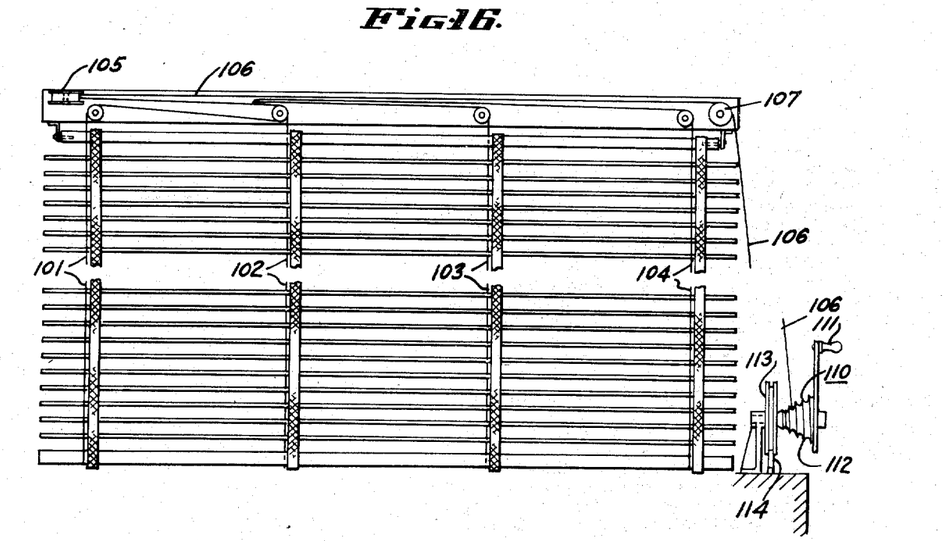
Figure 16 is a side view partly cut away of a Venetian blind incorporating the invention wherein a single cord lifts a blind higher than its width while still winding a single cord on a pulley of increasing leverage as the blind is raised.

In Figure 16 I have shown a modification wherein a Venetian blind has lifting cords 101, 102, 103, and 104 passing over pulleys almost over the ladder tapes adjacent each cord. In this instance cords 101 and 104 are on the near side of the blind adjacent the end ladder tapes while cords 102 and 103 are on the far side of the blind adjacent the two center ladder tapes. A large diameter, horizontal pulley 105 is placed at the left hand end of the head rail. Around this pulley passes a single lifting cord 106 which is secured to the ends of lifting cords 101, 102, 103, and 104. A large pulley 107 with a horizontal axis is located at the right hand side of the head rail over which single lifting cord 106 passes. A winding reel 110 is provided with a handle 111 and a tapered drum 112 and a one-way brake 113 with a braking cord 114 similar in action to cord 75 in Figure 10. By the use of tapered drum 112, you are able to start lifting the blind on the large portion of the drum near the handle 111 when the weight of the blind is not accumulated, as the slats are then supported largely on the ladder tapes and lift the blind with substantially constant effort on the lifting crank 111. The effective leverage between the crank and the radius on which the cord 106 is being wound increases as the blind is lifted and the radius of winding the lifting cord decreases during the lifting operation, thus tending to maintain the same lifting effort on the crank while the blind is being raised. The one-way brake drum and associated brake band 114 act to hold the blind in any desired position and to resist rotation which would lower the blind.

Figure 17:
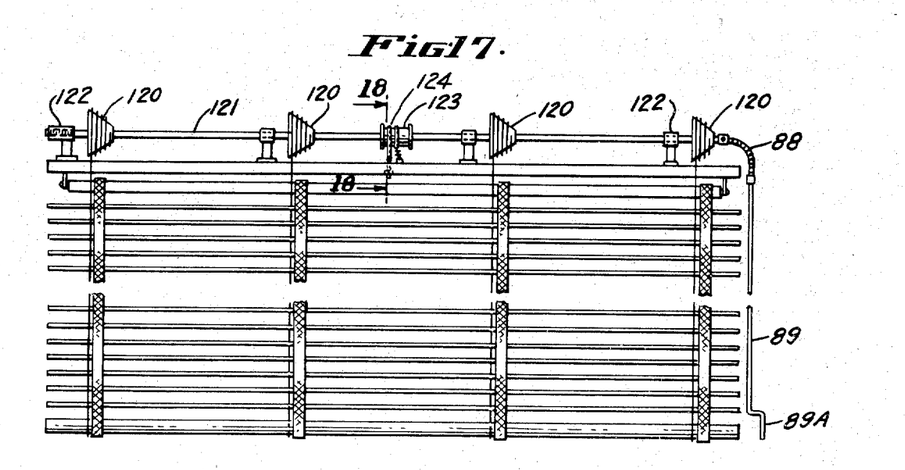
Figure 17 is a side view of another form of blind partly cut away incorporating a crank-operated lifting mechanism through a spring drive with decreasing radius pulleys as the blind is lifted and a one-way brake.

In Figure 17 I have shown a further modification wherein a series of tapered groove rolls 120 are mounted on oscillating shaft 121 which is suitably mounted on bearings supported on the head bearings 122, the left end one of which is preferably screw-threaded to give a lead action to the oscillating shaft 121. A spring drive 88 connects the oscillating shaft 121 with the operating crank 89A similar to the construction described in connection with Figure 12. One-way brake drum 123 has a brake cord 124 wound thereon to resist rotation of the lifting drums 120 in the direction which would lower the blind. This method allows a larger radius for winding the blind when starting at lower weight and decreasing the radius on which the lifting wires are wound as the blind becomes more fully lifted, to maintain the same resistance on the lifting crank throughout the lifting operation.

Figure 18:
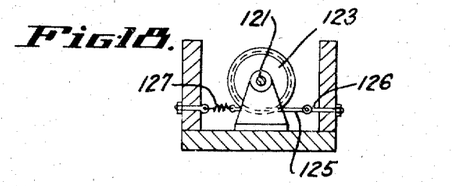
Figure 18 is an end view in section partly cut away taken at section 18—18 of Figure 17 showing a slight modification of that shown in Figure 17.

In Figure 18 I have shown a slight modification of the one-way brake in which a drum 123 is mounted on the oscillating shaft 121 and a braking cord 125 is wound on the drum, one end being adjustably secured by bolt 126 and the other to a spring 127 which may be adjustable to change the tension.

Figure 19:
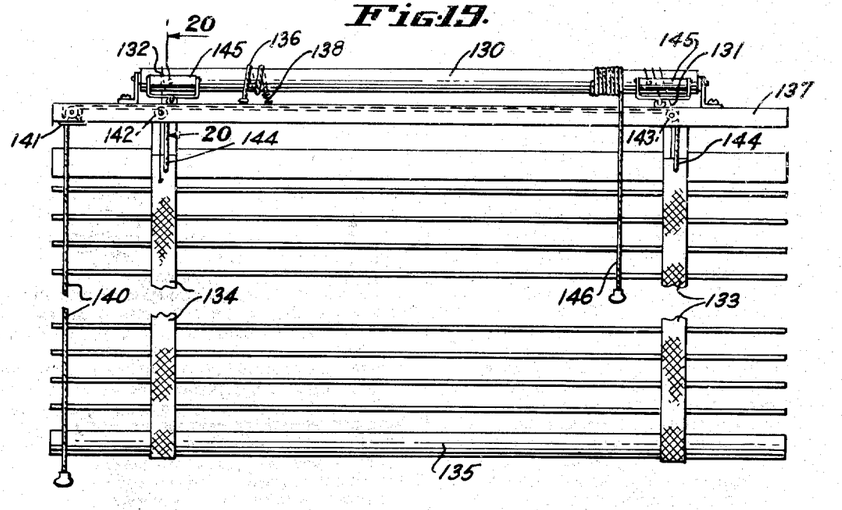
Figure 19 is a side view partly cut away of another form of blind construction incorporating still another form of the invention.
Figure 20:
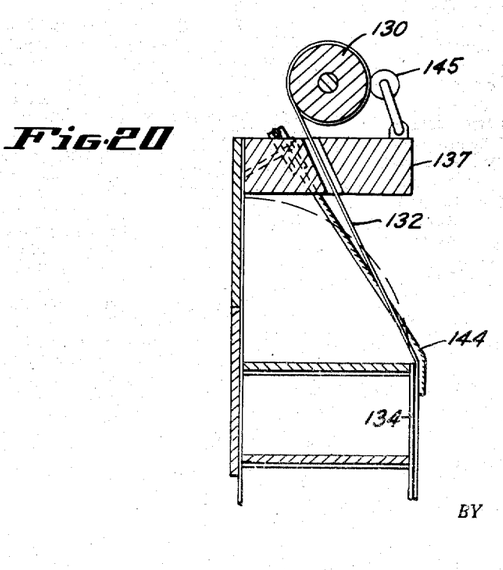
Figure 20 is a sectional view through section 20—20 of Figure 19.

In Figures 19, 20, and 21 I have shown still a further variation in which a roller bar 130 has a spring mounted therein in a manner similar to the usual curtain roller, but without the usual curtain stop catch. Lifting cords or wires 131 and 132 extend down by the ladder tapes 133 and 134 to the bottom rail 135. The action of the spring in the roller bar 130 tends to wind up the lifting wires 131 and 132 to lift the blind, but the action is not sufficient to overcome the weight of the bottom rail 135 and is merely sufficient to keep the lifting wires 131 and 132 tight at all times. One-way brake cord 136 is suitably anchored to the head rail 137 at one end and to a spring 138 at the other end to offer one-way braking against rotation of the roller bar 130 in the direction which would lower the blind. A tilting cord 140 goes through a cord-lock mechanism 141 over pulley 142 and 143 to be secured to one side of the ladder tape 133. A short cord 144 is attached to one side of the tape 133 and is secured to tilt cord 140 just above pulley 142. This acts to control the tilt of the blind.

A spring-urged roller 145 bears against each of the lifting wires 131 and 132 while being wound on the roller bar to prevent them from being tangled in case they are slackened. Lifting cord 146 may be wound on roller bar 130 to resist the lifting of the blind which may otherwise be lifted by merely raising the bottom rail manually in which case the roller bar will keep the slack out of the lifting wires 131 and 132 while the one-way brake 136 will support the weight of the blind in any desired position. When it is desired to lower the blind, this may be done by merely taking hold of the bottom rail and pulling it down as desired, as against the action of the one-way brake and the slide action of the spring and roller bar. This forms an exceedingly simple Venetian blind which may be readily raised and lowered directly like a window shade, and may be tilted with a single cord 140.

While I have described various constructions in considerable detail, it is to be understood that various modifications and departures from the construction described; and I do not wish in any way to limit myself to the exact details or mode of operation set forth in this specification and drawings, for it will be obvious that wide departure may be made in the way of details without departing from the spirit and scope of my invention which is set forth in the following claims.

I claim as my invention:

1. A Venetian blind lifting device, including a drum, a handle for manually turning said drum, and an automatic brake for resisting rotation of said drum in one direction of rotation of said drum more than in the other direction.

2. A Venetian blind lifting device, including a drum, a crank handle for manually rotating said drum, and an automatic brake, said brake offering more resistance to rotation of said drum when rotated in one direction than to the rotation of said crank when rotated in the other direction.

3. A Venetian blind lifting device, including a drum, a flexible element wound on said drum, a handle for manually rotating said drum, and automatic means for preventing continued rotation in one direction of said drum when said flexible element is unwound from said drum.

4. A Venetian blind lifting device, including a drum, a handle for manually turning said drum, and an automatic brake for resisting rotation of said drum in one direction of rotation of said drum more than in the other direction, and automatic means for preventing continued rotation in one direction of said drum when said flexible element is unwound from said drum.

5. A Venetian blind, a lifting device for said Venetian blind, including two or more flexible elements, a reel on which said flexible elements are wound, a hand crank for operating said reel, and a connection between said hand crank and said reel, including an automatic brake, said automatic brake offering more resistance to the rotation of said drum by a pull on said flexible element than to rotation of said drum by manual pressure on said crank in either direction of rotation.

6. A Venetian blind, flexible elements for lifting said Venetian blind, a reel, a manual crank for rotating said reel, a ratchet, yieldable means for urging the parts of said ratchet into cooperation to prevent rotation of said reel in one direction, and means controlled by the operator in contact with the handle alone for rendering said ratchet ineffective against desired rotation in the same direction of the drum which is normally prevented by said ratchet.

7. A Venetian blind, flexible elements for lifting said Venetian blind, and a friction element automatically actuated to offer greater resistance to said flexible elements when moving in a direction to lower said blind than when moving in the direction to raise said blind.

8. A Venetian blind, flexible elements for lifting said Venetian blind, and a friction element automatically actuated to offer greater resistance to said flexible elements when moving in a direction to lower said blind than when moving in the direction to raise said blind, said friction element acting on a brake drum.

9. A Venetian blind, flexible elements for lifting said Venetian blind, and a friction element automatically actuated to offer greater resistance to said flexible elements when moving in a direction to lower said blind than when moving in the direction to raise said blind, said friction element acting on a brake drum and forming one or more wraps around said brake drum with one end of the brake anchored and the other end yieldably urged to a tightening position.

10. A Venetian blind, flexible elements for raising said blind, a reel on which said flexible elements are wound during the raising operation of said blind, crank means for manually rotating said reel, a flexible spring drive between said crank and said reel, and a friction element acting on said reel offering substantially more resistance to rotation of said reel in the direction to lower said blind than to rotation in the direction for raising said blind.

11. A Venetian blind, having a head rail or equivalent, a multiplicity of flexible lifting elements, and a pulley at the top of said blind adjacent each flexible element over which said flexible element passes, all said flexible elements joined to a master flexible element, said master flexible element passing around one or more additional pulleys and then down to a drum on which said master cord is wound, said pulleys being so arranged that the master cord can raise the blind a greater distance than the width of the blind without the junction of the multiple cords with said master cord appearing beyond or below the end of said head rail when the blind is fully lifted.

12. A Venetian blind, having a head rail or equivalent, a multiplicity of flexible lifting elements, and a pulley at the top of said blind adjacent each flexible element over which said flexible element passes; all said flexible elements joined to a master flexible element, said master flexible elements passing around one or more additional pulleys and then down to a drum on which said master cord is wound, said pulleys being so arranged that the master cord can raise the blind a greater distance than the width of the blind without the junction of the multiple cords and said master cord appearing beyond or below the end of said head rail when the blind is fully lifted, an automatic brake mechanism acting on said drum to offer a greater resistance to rotation of said drum to a blind-lowering operation than to a blind-lifting operation.

13. A Venetian blind, one or more flexible elements for raising said Venetian blind, a drum on which said flexible elements are wound during the raising operation, a hand crank for rotating said drum, and an automatic brake for resisting the rotation of said drum to a substantially greater extent when rotating in a blind-lowering direction than to rotation in a blind-lifting direction, said drum adapted to wind said flexible element at a substantially greater radius when the blind is fully lowered than when the blind is fully raised.

14. A Venetian blind, a flexible element for raising said blind, a drum on which said flexible element is wound, a spring acting on said drum tending to rotate it into a blind-lifting position at all positions of said blind, and an automatic brake acting on said drum offering substantially increased resistance to rotation of said drum in a blind-lowering direction, said resistance being sufficient to support the weight of said blind in any desired position, said resistance being not self-locking so that it may be overcome manually for lowering the blind by additional manual force on said blind or on said drum.

15. A Venetian blind, a flexible element for raising said blind, a drum on which said flexible element is wound, a spring acting on said drum tending to rotate it into a blind-lifting position at all positions of said blind, and an automatic brake acting on said drum offering substantially increased resistance to rotation of said drum in a blind-lowering direction, said resistance being sufficient to support the weight of said blind in any desired position, said resistance being not self-locking so that it may be overcome manually for lowering the blind by additional manual force on said blind or on said drum, and an additional flexible element wound on said drum in such a direction that a manual pull on said flexible element will cause said drum to wind in a blind-lowering operation against said automatic brake to lower said blind manually where the blind might be out of reach of said operator.

BROOKS WALKER.

Patent No. 2,301,485                                      Granted November 10, 1942

BROOKS WALKER

The above entitled patent was extended July 24, 1951, under the provisions of the act of June 30, 1950, for 6 years and 214 days from the expiration of the original term thereof.

*Commissioner of Patents.*